United States Patent
Haglauer et al.

(10) Patent No.: US 10,549,593 B2
(45) Date of Patent: Feb. 4, 2020

(54) WHEEL SUSPENSION FOR A MOTOR VEHICLE

(71) Applicant: GM GLOBAL TECHNOLOGY OPERATIONS LLC, Detroit, MI (US)

(72) Inventors: Oswald Haglauer, Walluf (DE); Jens Hartmann, Floersheim (DE); Boris Kuenkler, Limburg (DE); Juergen Siebeneick, Oberwesel (DE); Ralph Nikolaus Bergmann, Ingelheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 131 days.

(21) Appl. No.: 15/907,305

(22) Filed: Feb. 28, 2018

(65) Prior Publication Data

US 2018/0244119 A1 Aug. 30, 2018

(30) Foreign Application Priority Data

Feb. 28, 2017 (DE) .......................... 10 2017 001 906

(51) Int. Cl.
| | |
|---|---|
| *B60G 7/02* | (2006.01) |
| *B60G 21/05* | (2006.01) |
| *B60G 5/04* | (2006.01) |
| *B60G 7/00* | (2006.01) |
| *B62D 21/11* | (2006.01) |

(52) U.S. Cl.
CPC ................. *B60G 7/02* (2013.01); *B60G 5/04* (2013.01); *B60G 7/001* (2013.01); *B60G 21/051* (2013.01); *B62D 21/11* (2013.01); *B60G 2200/21* (2013.01); *B60G 2204/1434* (2013.01); *B60G 2204/41* (2013.01); *B60G 2206/10* (2013.01); *B60G 2206/20* (2013.01)

(58) Field of Classification Search
CPC .......... B60G 7/02; B60G 21/051; B60G 5/04; B60G 7/001; B60G 2206/20; B60G 2200/21; B60G 2204/1434; B60G 2204/41; B60G 2206/10; B62D 21/11
See application file for complete search history.

(56) References Cited

U.S. PATENT DOCUMENTS

| | | | | |
|---|---|---|---|---|
| 2,083,627 | A * | 6/1937 | Youngren | B62D 17/00 280/86.753 |
| 2,885,219 | A * | 5/1959 | Paton | B60G 3/12 280/124.165 |
| 2,939,720 | A * | 6/1960 | Wroby | B60G 99/00 280/124.108 |
| 2,962,279 | A * | 11/1960 | Wroby | B60G 3/20 267/293 |
| 6,719,314 | B1* | 4/2004 | Schote | B60G 3/20 280/124.135 |
| 2005/0180670 | A1* | 8/2005 | Koschinat | B60G 7/02 384/428 |
| 2011/0043736 | A1* | 2/2011 | Liu | B82Y 20/00 349/119 |
| 2015/0375588 | A1* | 12/2015 | Czerr | B60G 3/202 280/124.135 |

* cited by examiner

*Primary Examiner* — Darlene P Condra
(74) *Attorney, Agent, or Firm* — Lorenz & Kopf, LLP

(57) ABSTRACT

A motor vehicle body has an underbody and a link, which at one end is pivotably connected to the underbody and at another end carries a wheel. The connection to the underbody includes an underbody-side bearing support, in which a link-side pin engages.

20 Claims, 4 Drawing Sheets

WHEEL SUSPENSION FOR A MOTOR VEHICLE

CROSS-REFERENCE TO RELATED APPLICATION

This application claims priority to German Patent Application No. 102017001906.1, filed Feb. 28, 2017, which is incorporated herein by reference in its entirety.

TECHNICAL FIELD

The present disclosure pertains to a wheel suspension for a motor vehicle, in particular a suspension of a rear wheel.

BACKGROUND

A wheel suspension for a motor vehicle generally includes one or more links, which at one end are pivotably connected to the underbody and on another end carry a wheel hub. The wheel suspension couples the wheel to the underbody so that said wheel with respect to the underbody is substantially movable only in one single degree of freedom, so that a wheel can be cushioned with a spring and dampened with a shock absorber without being able to avoid the damping forces transversely to their active direction.

The connection to the underbody is usually established in that the underbody-side end of the link is formed as a sleeve or a ring through the aperture of which a pin fixed on the underbody and held between two walls projecting downwards from the underbody, extends, which determines the course of an axle about which the link is pivotable. When in the aperture in the usual manner an elastic element surrounding the pin is provided, space for the ring and adequate free space has to be present between the axle and the underbody in order to make possible an evasive movement of the link when travelling over an irregularity, during which evasive movement the link does not hit the underbody, i.e. the distance between a pivot axis of the link and the underbody must not be too small.

On the other hand, it is desirable to minimize the height of the vehicle body in particular in the rear region in order to minimize the drag coefficient and thus the fuel consumption without having to restrict the useful height of the passenger cabin for this purpose.

SUMMARY

In accordance with the present disclosure a vehicle body is provided which minimize the height of the vehicle body while allowing sufficient suspension travel.

According to a configuration of the present disclosure, a motor vehicle body includes an underbody and a link, which at one end is pivotably connected to the underbody and at another end carries a wheel. The connection of the link to the underbody includes an underbody-side bearing support, in which a link-side pin engages. In that the bearing support is provided on the underbody-side and thus fixed in place or at least with respect to the underbody less moveable than the pin, the need for providing a free space for movements of the link roundabout the bearing support is no longer required. The space for the conventional sleeve is no longer required either. Accordingly, the distance between underbody and link can be significantly reduced and the height of the body reduced without loss of comfort for the vehicle occupants.

The bearing support may include an elastic sleeve in which the pin engages. Such a sleeve can effectively dampen movements of the link relative to the underbody.

The underbody-side end of the link is preferably forked, with the pin being fastened to two tines of the fork. The bearing support may engage into an intermediate space of the fork such that the tines of the fork can hold the pin on both sides of the bearing support.

The underbody may include a side member from which a front section extends under a passenger cabin and a rear section traverses a rear axle of the motor vehicle body at a level above the front section. In order to save space, the underbody-side bearing support with such an underbody can be arranged in an indentation that is delimited by the rear section and a flank of the side member rising between the sections. In order to achieve a high load capacity with low costs, the bearing support may, furthermore, be fastened to the rear section and the flank.

A zero mount, on the contours, in particular holes, of which transport tools of an assembly line act during the line assembly in a conventional manner and the contours of which are utilized as position reference for attaching further components during the assembly, can be mounted below the front section of the side member adjoining the indentation. Then, for improving the stiffness of the underbody, the bearing support can also be fastened to the zero mount.

The bearing support may improve the load capacity of the side member in that it absorbs tensile stresses occurring in the side member. For this purpose, a floor section of the bearing support crossing below the pin can extend between a front welding flange, which is welded to a lower side of the zero mount, and a rear welding flange, which is welded to a lower side of the rear section of the side member. Alternatively, the zero mount can be embodied in one piece with the bearing support or with at least one component of the bearing support.

In that both welds are arranged on the lower side of the side member they are, by way of tensile stress acting in the longitudinal direction of the side member, subjected to load parallel to their surface, i.e. shearing and can therefore absorb high loads without risk of failing.

As a consequence of the preferred configuration, the bearing support includes two side walls with apertures through which the link-side pin extends and a floor section, by which the side walls are joined along their lower edges. Both the side walls can be produced from a same flat material cutting and be unitarily joined along the floor section. Alternatively, the bearing support can be joined from at least components consisting of flat material, of which each forms one of the side walls. One of these components can be embodied in one-piece with the zero mount. Such a one-piece or two-piece bearing support can be cost-effectively provided by forming the cutting.

For increasing the load capacity, upper edges of the two side walls can be welded to the side member. These upper edges are preferentially formed by flanges lying against lateral flanks of the side member.

A tube section inserted into the apertures of the side walls makes possible a large-area distribution of the forces that occur between link and underbody, when both are separated from one another by an elastomer sleeve, thus counteracting premature wear.

Steps formed in the side walls of the bearing support may lie against a lower side of the side member and, by absorbing a part of the weight of the body in this way, take load off other connections between bearing support and side member, such as for example the abovementioned flanges laterally lying against the side member.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
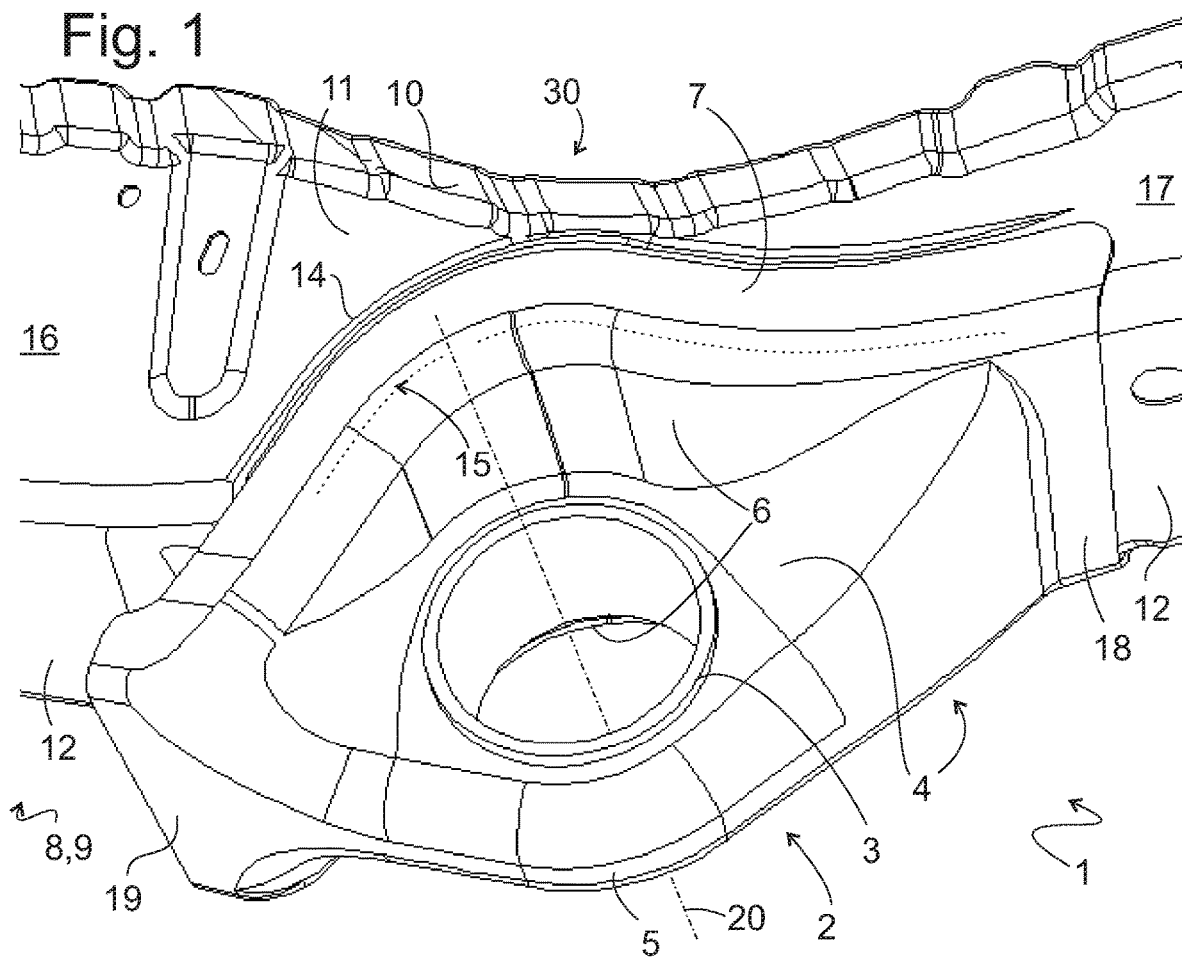
FIG. 1 shows a perspective view of a bearing support according to a first configuration of the present disclosure, fastened to a side member.

FIG. 1 shows a bearing support 1, which is to serve for the suspension of a link of a rear axle in a motor vehicle. The bearing support 1 is shown in the installation orientation as applicable on the finished vehicle at the oblique perspective of the view from below.

The bearing support 1 is joined from two parts, a three dimensionally formed sheet metal stampings 2 and a tube section 3. The sheet metal stampings 2 include two approximately diamond-shaped side walls 4 which are approximately parallel to one another or slightly diverging towards the top, which side walls 4 are unitarily joined along their lower edges via a floor section 5. An upper edge of the side walls 4 is followed by steps 6 each standing away in vehicle transverse direction to opposite sides and flanges 7 angled upwards are formed at an outer edge of the steps 6.

In a central region of the side walls 4, a circular hole is cut out in each case. The tube section 3 is pushed into the holes that are aligned with one another and welded to the side walls 4 along the edges of the holes.

In the region of the holes and the tube section 3, the distance between the side walls 4 is comparatively small. From there, the distance and the width of the floor section 5 increase in vehicle longitudinal direction towards the front and towards the rear, while the width of the steps 6 decreases at the same time so that the front and rear tips of the diamond-shaped side walls 4 directly reach up against the flanges 7.

Above the bearing support 1, a piece of a side member 8 is visible which, typically joined from multiple components, extends from a front bumper located on the left on the other side of the limits of FIG. 1 over the entire length of the motor vehicle as far as to a rear bumper located on the right on the other side of the limits of FIG. 1. The piece shown in FIG. 1 includes a component 9 in the form of a channel that is open towards the top which, by way of a placed-on closing plate welded to flanges extending at the edges of the component 9 such as for example the flange 10 visible in the figure, is to be complemented to form a hollow section with closed cross section.

Below the flange 10 there extends a side wall 11 and a floor wall 12 of the component 9. A second side wall 13 (see for example FIG. 2) of the component 9 is concealed in FIG. 1 and not visible.

In the side walls 11, 13, a flat indentation is stamped which receives the flanges 7 of the bearing support 1 over a large part of their length and in which the flanges 7 are welded to the side walls 11, 13. In FIG. 1, an upper edge 14 of the depression of the side wall 11 is noticeable and extends at uniform distance to the section of the floor wall 12 concealed by the bearing support 1 in FIG. 1. By way of the course of the upper edge 14 it is thus easily imagined that the floor wall 12 in the concealed section forms an indentation with a flank rising in the vehicle longitudinal direction towards the rear in the region marked by an arrow 15 and an approximately horizontal flank following thereon and extending towards the rear as far as to beyond the bearing support 1, and that the rising flank connects a front section 16 of the side member with a rear section 17 extending at a higher level. The front section 16 extends through below a passenger cell (not shown in the figure) of the vehicle towards the front. The rear section 17 extends above a rear axle (not shown in the figure) towards the rear of the vehicle.

A rear edge of the sheet metal stampings 2 is formed by a flange 18 which extends approximately horizontally in vehicle transverse direction between the rear ends of the flanges 7 and is welded to the floor wall 12. A flange 19 extending horizontally in the vehicle transverse direction also connects the front ends of the flanges 7. In contrast with the rear flange 18, the front flange 19 however does not lie against the floor wall 12 and front ends of the lateral flanges 7 also project downwards over and beyond the floor wall 12. These front ends and the flange 19 are provided for being welded to a rear zero mount of the vehicle, as will still be explained in more detail later on.

Figure 2:
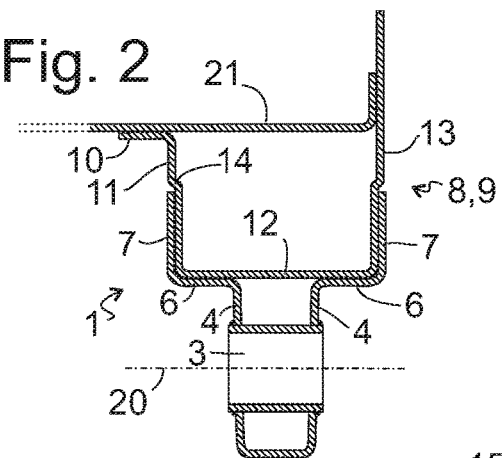
FIG. 2 is a vertical section through the bearing support.

FIG. 2 shows a section through the bearing support and the side member 8 along a section plane extending vertically and, in the vehicle, transverse direction. The section plane coincides with a longitudinal axis 20 of the tube section 3. Evident are the indentations on the side walls 11, 13 of the side member in which the flanges 7 of the bearing support engage and the floor wall 12 lying on the steps 6 of the bearing support 1. The abovementioned closing plate, which completes the component 9 to form the side member 8, is a seat panel 21 of the passenger cabin which carries a rearward row of seats and extends as far as to the opposite side of the vehicle.

Figure 3:
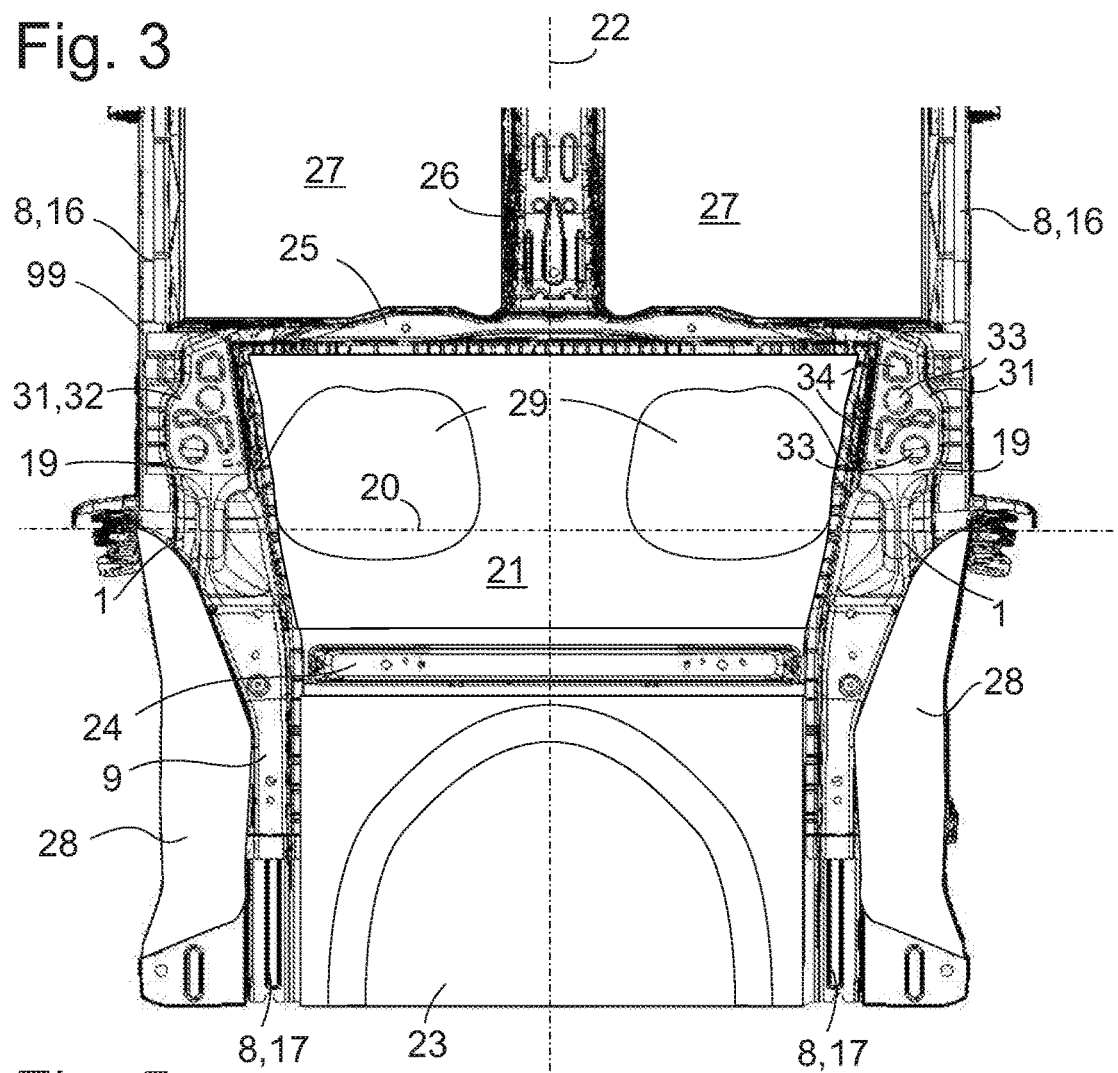
FIG. 3 shows a view of a rear part of a vehicle underbody with bearing supports of the type shown in FIGS. 1 and 2.

FIG. 3 shows a view from below of a rear part of a vehicle underbody 99. Starting out from the rear of the vehicle at the lower edge of the figure, the following follow one another along a longitudinal center plane 22: a load compartment floor 23, in which a spare wheel trough is molded, a cross member 24, the floor panel 21, a heel plate 25 and a center tunnel 26. The heel plate 25 substantially extends vertically in order to bridge a difference in height between the seat panel 21 and two floor panels 27 extending on both sides of the center tunnel 26.

The side members 8 are welded to the cross member 24, the heel plate 25 and possibly further cross members to form a ladder-type frame, into which the load compartment floor 25, the seat panel 21 and the floor panels 27 are placed and welded to flanges projecting from the side members and cross members.

The rear section 17 of the side members 8 extends between the load compartment floor 23, the cross member 24 and the seat panel 21 on the one hand and a rear wheelhouse 28 on the other hand. Here, the front section 16 is offset relative to the rear section 17 not only vertically but also laterally and forms a sill extending along the outer edges of the floor panels 27.

In the seat panel 21, two troughs 29 are molded which reach up as far as to the flanges 10 of the two side members 8 and which, in their profile visible in FIG. 1 are depicted as indentation 30 above the tube section 3.

At the transition between front section 16 and rear section 17 a bearing support 1 each is mounted on the lower side of the two side members 8. The longitudinal axes 20 of the bearing supports 1 lie on a same line. The front flanges 19 of the bearing supports 1, as already mentioned, are welded to a rear zero mount 31. In a base plate 32 of the zero mounts 31 facing the beholder in FIG. 3, holes 33 and protrusions 34 are formed, in which complementary contours of an assembly line conveying the vehicle from one assembly station to the next engage during the assembly of the vehicle.

Figure 4:
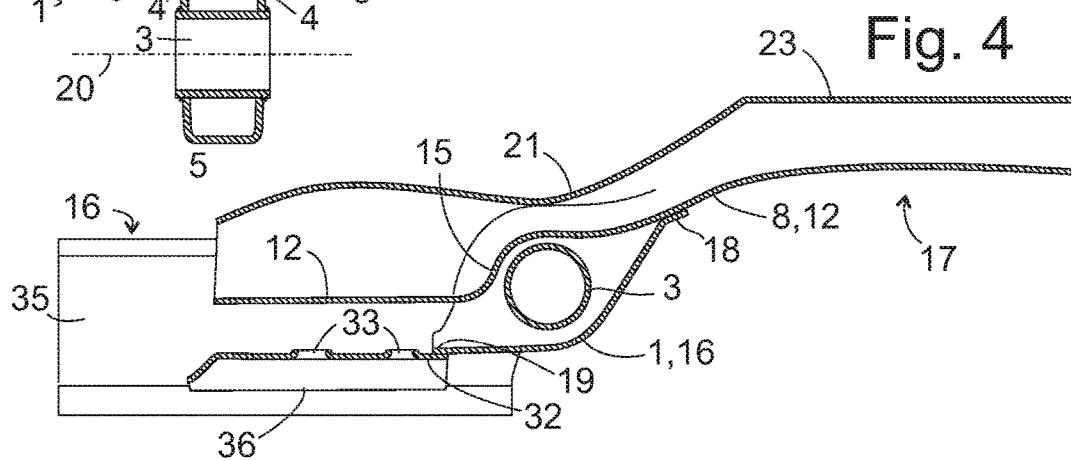
FIG. 4 is a longitudinal section through a side member, a bearing support and a zero support.

In order to make it possible for these complementary contours to engage adequately deep for a secure hold, the base plate 32 is held spaced from the floor wall 12. To this end, front flange 19 of the bearing support 1 is welded lying on the base plate 32 of the zero mount 31 as visible in the longitudinal section of FIG. 4 and an edge 36 of the base plate 32 facing the vehicle outside is welded to a lower side of a sill profile 35 forming a part of the front section 16 of the side member 8 (see also FIG. 7). At an edge of the base plate 32 which is not visible in FIG. 4 since located in front of the section plane and facing the longitudinal center plane 22, a leg 37 of the zero mount 31 is angled upwards and welded to the side wall 11 of the component 9 (see FIG. 7).

Figure 5:
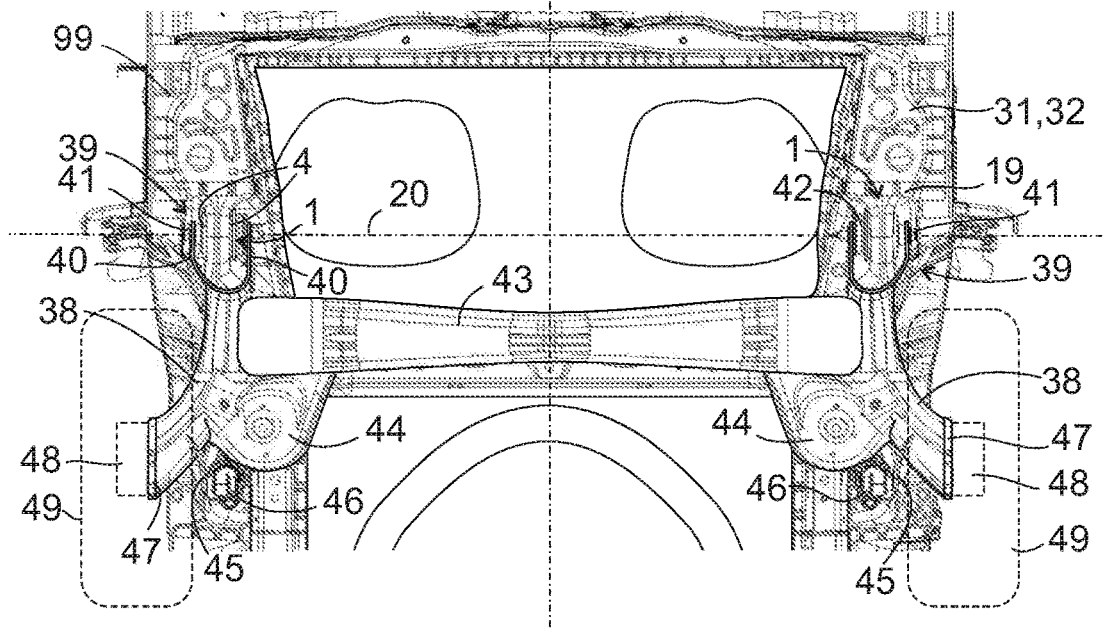
FIG. 5 shows a view of the underbody with links mounted to the bearing supports.

FIG. 5 shows an extract of the underbody 99 as FIG. 3 in a view from below, with links 38 pivotably mounted to the bearing supports 1 about the axis 20. The two links 38 are curved hornlike and carry a fork 39 at one end, the two tines 40 of which engage about the side walls 4 of the bearing support 1 on both sides. A pin 41 is anchored on both tines 40 and extends along the axis 20 through the tube section 3 of the bearing support 1. The pin 41 is surrounded by an elastic sleeve 42 pressed into the tube section 3.

A cross beam 43 is rigidly connected to both links 38 and couples the pivot movements about the axis 20 of these. Along the convex side of the link 38, the cross beam 43 is followed by a spring disc 44 which in the view of FIG. 5 conceals a spring arranged between it and the side member 8 extending above the same, and a counter bearing 45 of a shock absorber 46.

The second end of each link 38 is a flange 47 with surface normal parallel to the axis 20, which is provided in order to mount a hub 48 of a wheel 49 thereon. So as not to conceal the flange 47, hub 48 and wheel 49 are drawn transparently as dashed outlines in FIG. 5.

Figure 6:
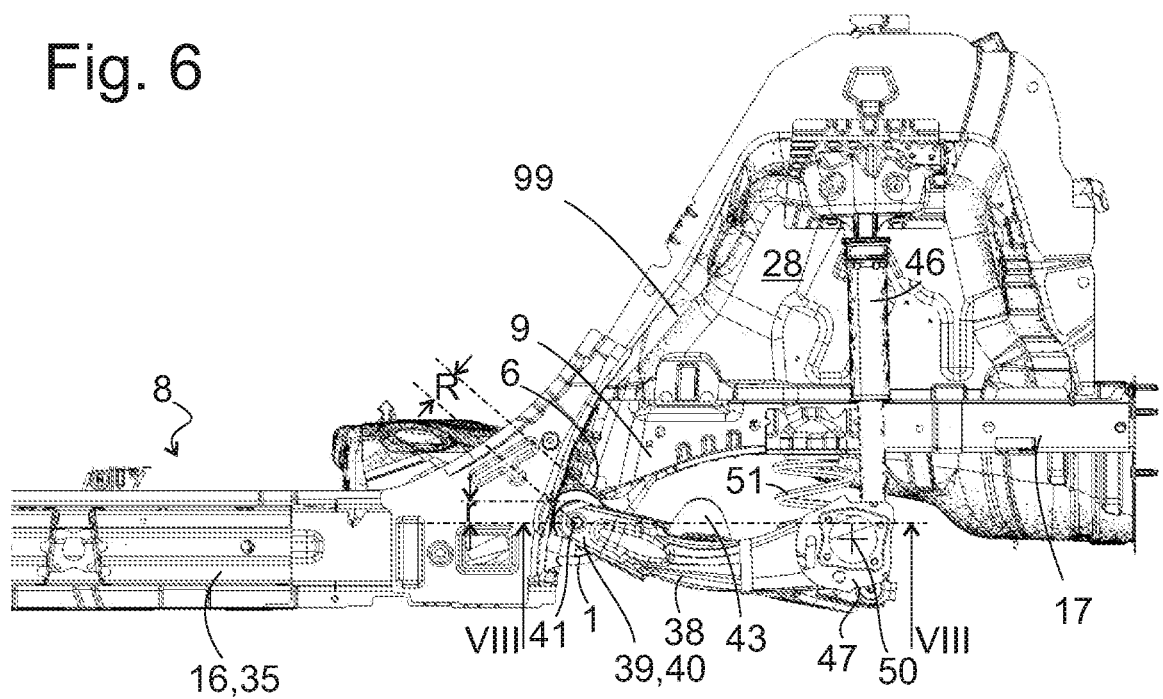
FIG. 6 is a lateral view of the underbody and of a link mounted thereon.

FIG. 6 shows a lateral view of the underbody 99 with the link 38 mounted on the bearing support 1. Clearly visible is the height profile of the side member 8 with the front section 16 extending in floor height of the passenger cell including the sill profile 35 and the rear section 17 extending at a higher level above the rear axle 50 extending through the flange 47, the spring marked with 51 and the shock absorber 46.

The tines 40 of the link fork 39 have a semi-circular tip centered about the axis 20. The radius r of the semi-circle is smaller than the radius R of the tube section 3 of the bearing support 1, so that the tines 40 cannot strike the step 6 extending above and in vehicle longitudinal direction in front of the tube section 3 and not any other point of the underbody 99.

Figure 7:
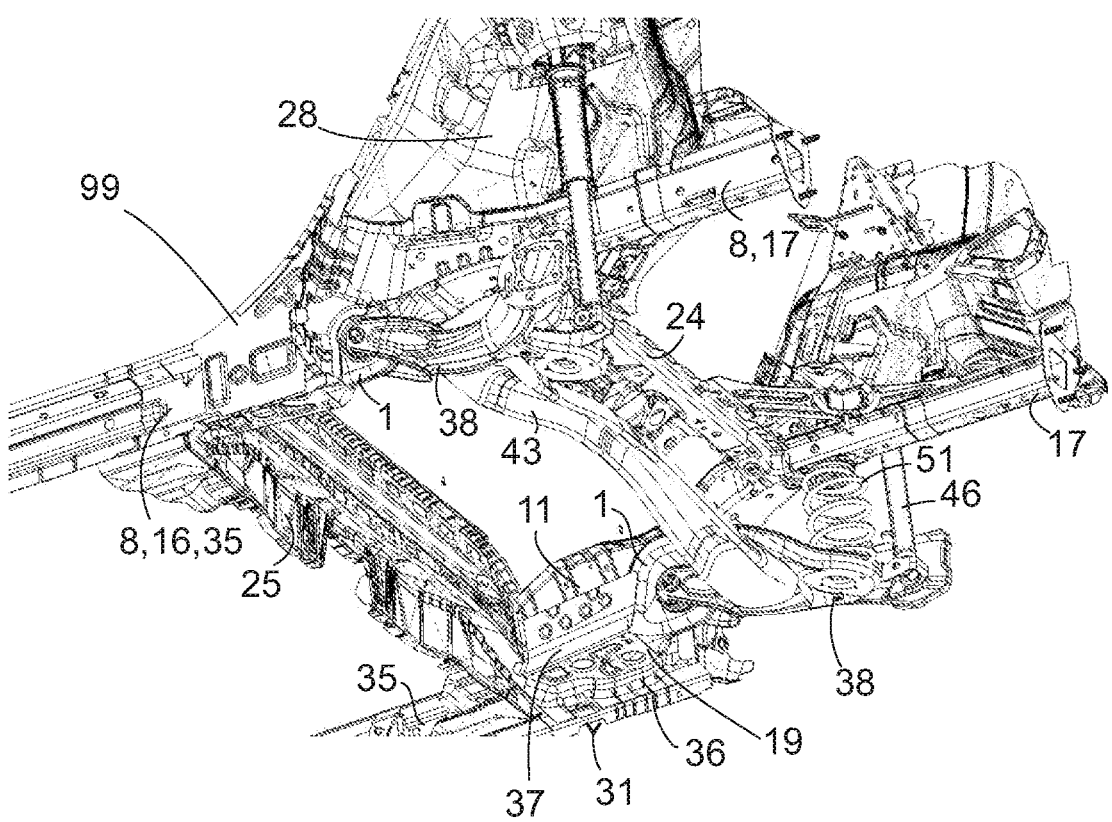
FIG. 7 shows a view of the underbody and the link mounted thereon obliquely from below.

FIG. 7 shows the underbody 99 with the two links 38 mounted thereon and connected by way of the cross beam 43 in a perspective view. In each case, an outside and a side facing the vehicle interior is visible of the links 38, the bearing supports 1, the side members 8. In particular on the zero mount 31 of the right vehicle side facing away from the beholder, the leg 37 angled upwards and welded to the side wall 11 of the side member and the outer edge 36 welded to the sill section 35 are clearly visible. This profile 36 merges into a flange 59 towards the front, which is welded to the heel plate 25. It can be easily followed that the bearing support 1 and the zero mount 31 adjoining thereon can also be designed in one piece according to a modification which is not separately drawn.

Figure 8:
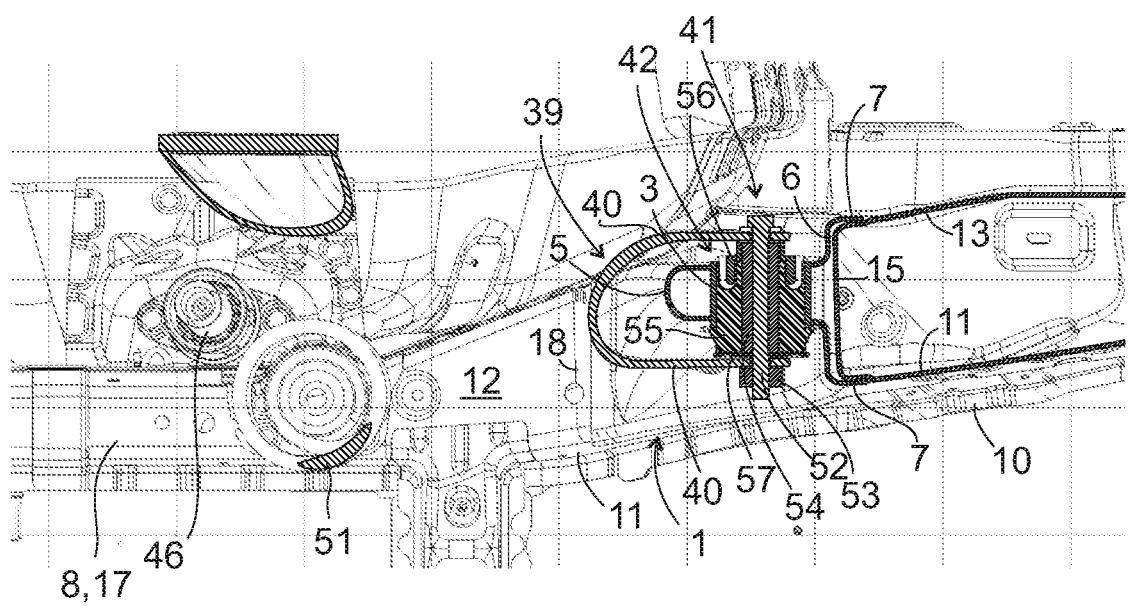
FIG. 8 is a section along the plane VIII-VIII from FIG. 6.

FIG. 8 shows a section along the plane VIII-VIII of FIG. 6. The section plane extends horizontally through the axis 20. The viewing direction is upwards as in FIGS. 3 and 5 which is why of the link 38 only the parts located above the section plane are visible, i.e. the fork 39 and a piece adjoining the flange 47.

The pin 41 is composed of a screw 52, which penetrates two bores in the tines 40 of the fork 39, and a nut 53 locking the screw 52 in the bores. The sleeve 42 includes a rigid sleeve 54 and an elastomer body 55 which annularly surrounds the sleeve 54 and covers 56, 57, which prevent a frictional contact of the elastomer body 55 with the tines 40 and support the elastomer body 55 in the axial direction in order to prevent excessive deformation of the elastomer body 55 when exposed to high loads.

Figure 9:
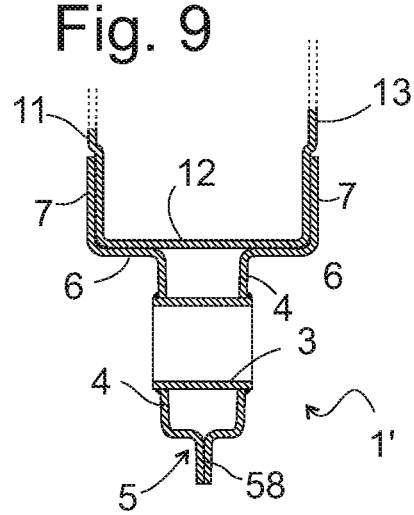
FIG. 9 is a section analogous to FIG. 2 according to a second configuration.

FIG. 9 shows a version of the bearing support 1' in a vertical section analogous to FIG. 2. The bearing support 1' is joined from two sheet metal stampings 2', each of which forms a side wall 4, a step 6 and a flange 7. The sheet metal stampings 2' are connected to one another via flanges 58 extending along the floor section 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:
1. A motor vehicle body comprising:
an underbody; and
a link having a first end pivotably connected to the underbody and a second end carrying a wheel, wherein the connection to the underbody comprises an underbody-side bearing support engaging a link-side pin, the first end of the link being forked at a fork, and the bearing support engaging in an intermediate space of the fork.

2. The motor vehicle body according to claim 1, wherein the underbody-side bearing support comprises an elastic sleeve engaging the pin.

3. The motor vehicle body according to claim 1, further comprising a side member of the underbody includes a front section extending below a passenger cabin and a rear section which at a higher level than that of the front section traverses a rear axle of the motor vehicle body, wherein the underbody-side bearing support is arranged in an indentation delimited by the rear section and a flank of the side member rising between the sections and fastened to the rear section and the flank.

4. The motor vehicle body according to claim 3, further comprising a zero mount mounted below the front section of the side member adjoining the indentation, wherein the bearing support is fastened to the zero mount.

5. The motor vehicle body according to claim 4, further comprising a floor section of the bearing support traversing below the pin and extending between a front welding flange welded to the zero mount and a rear welding flange welded to a lower side of the rear section of the side member.

6. The motor vehicle body according to claim 3, wherein the bearing support comprises a one piece component having a zero mount.

7. The motor vehicle body according to claim 3, wherein the bearing support further comprises two side walls with apertures, through which the link-side pin extends, and a floor section, by which the side walls are joined along their lower edges.

8. The motor vehicle body according to claim 7, wherein the two side walls respectively define an upper edge that is joined to the side member at a weldment.

9. The motor vehicle body according to claim 8, wherein the upper edges are formed by flanges that lie against lateral flanks of the side member.

10. The motor vehicle body according to claim 7, wherein the side walls and the floor section are formed in one piece from flat material.

11. The motor vehicle body according to claim 7, wherein the side walls, at which the bearing support is joined from two components, of which each comprises one of the side walls.

12. The motor vehicle body according to claim 7, wherein the bearing support further comprises a tube section inserted in the apertures of the side walls.

13. The motor vehicle body according to claim 7, wherein in the side walls of the bearing support comprise a step which lies against a lower side of the side member.

14. A motor vehicle body comprising:
an underbody with a side member, the side member including a front section extending below a passenger cabin and a rear section which at a higher level than that of the front section traverses a rear axle of the motor vehicle body; and
a link having a first end pivotably connected to the underbody and a second end carrying a wheel, wherein the connection to the underbody comprises an underbody-side bearing support engaging a link-side pin, the underbody-side bearing support being arranged in an indentation delimited by the rear section and a flank of the side member rising between the front and rear sections and fastened to the rear section and the flank.

15. The motor vehicle body according to claim 14, wherein the underbody-side bearing support comprises an elastic sleeve engaging the pin.

16. The motor vehicle body according to claim 14, further comprising a zero mount mounted below the front section of the side member adjoining the indentation, wherein the bearing support is fastened to the zero mount; and
further comprising a floor section of the bearing support traversing below the pin and extending between a front welding flange welded to the zero mount and a rear welding flange welded to a lower side of the rear section of the side member.

17. The motor vehicle body according to claim 14, wherein the bearing support further comprises two side walls with apertures, through which the link-side pin extends, and a floor section, by which the side walls are joined along their lower edges;
wherein the two side walls respectively define an upper edge that is joined to the side member at a weldment; and
wherein the upper edges are formed by flanges that lie against lateral flanks of the side member.

18. The motor vehicle body according to claim 17, wherein the bearing support further comprises a tube section inserted in the apertures of the side walls.

19. The motor vehicle body according to claim 17, wherein the side walls of the bearing support comprise a step which lies against a lower side of the side member.

20. A motor vehicle body comprising:
an underbody with a side member; and
a link having a first end pivotably connected to the underbody and a second end carrying a wheel, wherein the connection to the underbody comprises an underbody-side bearing support engaging a link-side pin, the bearing support including two side walls with apertures, the bearing support including a tube section inserted in the apertures of the side walls, the link-side pin extending through the apertures and the tube section, the bearing support including a floor section, the side walls respectively including lower edges that are joined by the floor section.

* * * * *